(12) United States Patent
Wood

(10) Patent No.: US 7,184,194 B2
(45) Date of Patent: Feb. 27, 2007

(54) METHOD FOR INCREASING THE RESOLUTION OF A SPATIAL LIGHT MODULATOR

(75) Inventor: Lawson A. Wood, Arlington, VA (US)

(73) Assignee: Acacia Patent Acquisition Corporation, Newport Beach, CA (US)

(*) Notice: Subject to any disclaimer, the term of this patent is extended or adjusted under 35 U.S.C. 154(b) by 0 days.

(21) Appl. No.: 11/014,871

(22) Filed: Dec. 20, 2004

(65) Prior Publication Data

US 2006/0132889 A1    Jun. 22, 2006

(51) Int. Cl.
*G02B 26/00* (2006.01)
*G09G 3/34* (2006.01)

(52) U.S. Cl. .......................... 359/291; 345/85

(58) Field of Classification Search ............. 345/84, 345/85, 87, 88; 359/291, 292
See application file for complete search history.

(56) References Cited

U.S. PATENT DOCUMENTS

| | | | |
|---|---|---|---|
| 5,835,120 A | 11/1998 | Hamano et al. | |
| 6,574,032 B1 * | 6/2003 | Roddy et al. | 359/290 |
| 6,922,277 B2 | 7/2005 | Moon et al. | |
| 6,935,749 B2 | 8/2005 | Kato | |
| 6,953,268 B2 | 10/2005 | Kimura et al. | |
| 6,971,748 B2 | 12/2005 | Cho et al. | |
| 2004/0136204 A1 | 7/2004 | Asao | |
| 2005/0146540 A1 | 7/2005 | Marshall et al. | |
| 2005/0152033 A1 | 7/2005 | Kang et al. | |
| 2005/0213064 A1 | 9/2005 | Katayama et al. | |
| 2005/0225732 A1 | 10/2005 | Conner et al. | |
| 2005/0225833 A1 | 10/2005 | Marshall | |
| 2005/0259308 A1 | 11/2005 | Itoh et al. | |
| 2006/0033887 A1 | 2/2006 | Wang | |

* cited by examiner

*Primary Examiner*—David N. Spector

(57) ABSTRACT

In a method for increasing the native resolution of a spatial light modulator, the light-modulating elements of the spatial light modulator are illuminated with spots of light that are smaller in size than the light-modulating elements. The spots of light are moved to different positions with respect to the light-modulating elements as different data are displayed. The light-modulating elements thus do double-duty (or triple-duty, or quadruple-duty, or more) as the spots of light are moved to different positions.

14 Claims, 3 Drawing Sheets

METHOD FOR INCREASING THE RESOLUTION OF A SPATIAL LIGHT MODULATOR

BACKGROUND OF THE INVENTION

The present invention is directed to a display method which employs a spatial light modulator, such as a liquid crystal display or digital micromirror device.

A digital micromirror device is a spatial light modulator which employs an array of tiny mirrors, or micromirrors, whose positions can be electrically controlled in order to display an image. This technology has been developed extensively by Larry J. Hornbeck and others at Texas Instruments, Inc. of Dallas, Tex., and is described by them in a sequence of patents going back years. These developmental efforts have culminated in a digital micromirror device which includes an array of memory cells and a corresponding array of pivotable micromirrors whose positions are electrostatically adjusted by the contents of the memory cells. As is perhaps best described in U.S. Pat. No. 5,096,279 to Hornbeck et al, the array of pivotable micromirrors that cooperates with the memory cells can be made using integrated circuit fabrication techniques.

As is described in the above-identified patent, in U.S. Pat. No. 5,280,277 to Hornbeck, and in an article entitled "Mirrors on a Chip" that was published in the November, 1993 issue of *IEEE Spectrum* at pages 27–31 by Jack M. Younse, a negative biasing voltage is selectively applied to the micromirrors and to landing electrodes fabricated beneath them in order to obtain bistable operation of the micromirrors and simultaneous updating of the entire array of micromirrors. Sometimes the micromirrors get stuck. It is known that this problem can be cured by subjecting the micromirrors to resonant reset pulses which electrostatically dislodge any stuck micromirrors.

It is also known to make a color display using a single digital micromirror device by sequentially exposing it to red, green, and blue light impinging from a single direction. A white lamp and a color wheel can be employed for this purpose. In situations where it is economically feasible to devote three digital micromirror devices to a display, each of them can be illuminated by light of a different primary color and the resulting red, green, and blue images can then be superimposed on a screen.

Advances have also been made in other types of display apparatuses. For example U.S. Pat. No. 5,122,791 to David J. Gibbons et al discloses a ferroelectric LCD panel which is selectively backlit by red, green, and blue fluorescent tubes. The intensity or duration of the backlighting is controlled on the basis of the rank of the bits that are being displayed on the panel.

Applicant's U.S. Pat. No. 5,416,496 also employs a ferroelectric LCD that is back-lit with colored lights. The colored light may be generated in flashes whose intensity is controlled on the basis of the rank of the video information bits that are being displayed. Alternatively, instead of flashes of light, the LCD panel may be illuminated by light that is generated steadily, and whose intensity is determined by the rank of the bits that are being displayed. In the latter alternative, the pixels of the panel are turned on in accordance with the video information on a row-by-row basis, and are subsequently turned off in accordance with the same video information, again on a row-by-row basis. As a result, each pixel that is turned on and then turned off receives the same amount of light regardless of its row, so the LCD can be addressed row-by-row with video information while the LCD is being illuminated.

Applicant's U.S. Pat. Nos. 6,348,907 and 6,535,187 are directed to displays using LCDs and DMDs. These patents disclose a variety of techniques for varying and controlling the intensity of light falling on a spatial light modulator and feeding bit ranks of digital words that define an image to the spatial light modulator in a coordinated manner. The patents also disclose other advances, including displaying an image frame during multiple revolutions of a color wheel, a DMD with micromirrors having pivot axes in orthogonal directions (for illumination by light impinging in three directions), and alternatives to the use of resonant reset pulses to dislodge stuck micromirrors and electromechanical latching to update all micromirrors simulatneously.

SUMMARY OF THE INVENTION

A primary object of the invention is to provide a method for increasing the native resolution of a spatial light modulator having an array of light-modulating elements, such as micromirrors in a DMD or liquid crystal cells in an LCD.

This object can be attained by exposing an image-forming area of the spatial light modulator to light in a pattern such that the light illuminates only part of the light-modulating elements. The light pattern can then be shifted to illuminate one or more additional parts of the light-modulating elements. Different data can thus be displayed at different portions of each light-modulating element. In other words, each light-modulating element can be used to produce two or more dots in an image.

In accordance with one aspect of the invention, a method for displaying a color component of an image described by video words of a frame, with these video words for the color component having bits with different bit ranks, includes the step of turning the light-modulating elements of the spatial light modulator on or off in accordance with the values of some of the video words for a given bit rank, exposing the spatial light modulator to a light pattern that produces spots of light that are smaller in size then the light-modulating elements, turning the light-modulating elements on or off in accordance with values of others of the video words for the given bit rank, and exposing the spatial light modulator began to the light pattern, but shifted with respect to the earlier exposure. This changes the position of the spots of light, so that each of the light-modulating elements modulates more than one dot in the image formed by the spatial light modulator.

DESCRIPTION OF THE PREFERRED EMBODIMENTS

Figure 1:
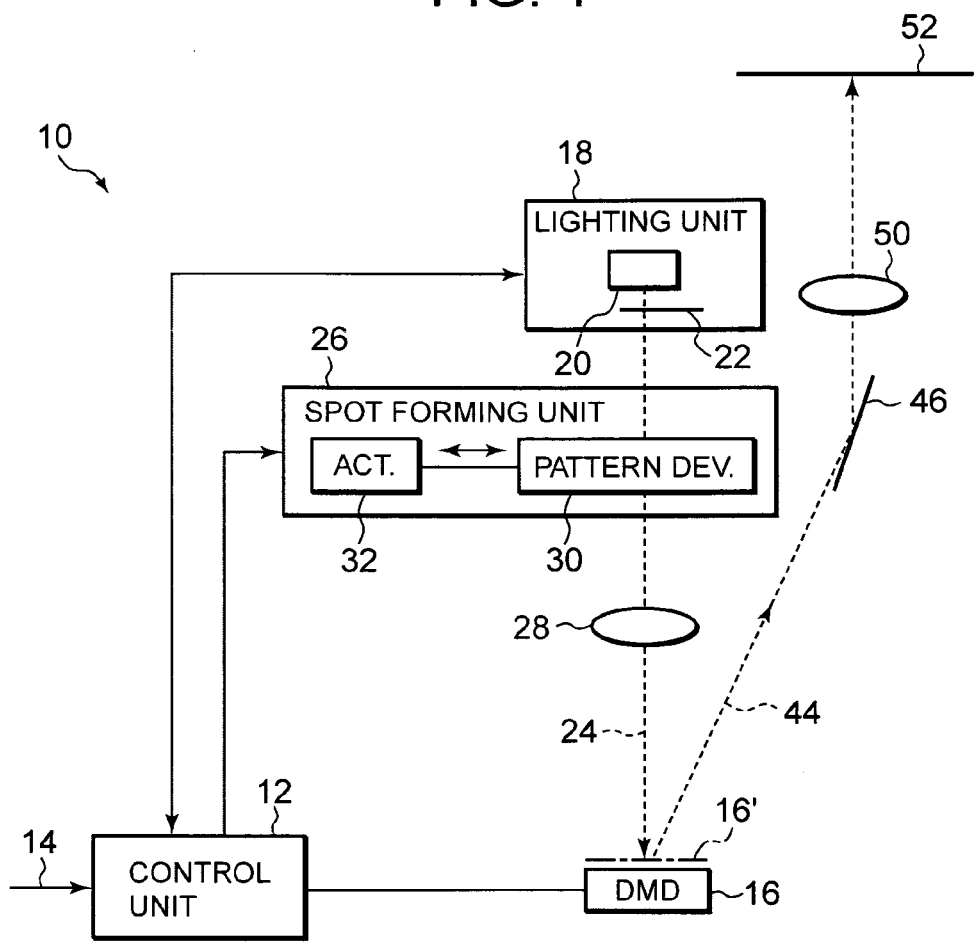
FIG. 1 is a block diagram of a display apparatus that performs a method in accordance with the present invention.

With initial reference to FIG. 1, a display apparatus 10 includes a control unit 12 that receives multi-bit digital words 14 for the red, green, and blue components of a sequence of image frames. These digital words (sometimes called "video words" hereafter) will frequently be referred to hereafter as red digital words, green digital words, and blue digital words. The control unit 12 transfers the digital words for a frame to a digital micromirror device (DMD) 16 in some predetermined sequence. For example, the least significant bits of half of the red digital words may be transferred first, whereupon the micromirrors (not illustrated in FIG. 1) of the DMD 16 move to off or on positions depending on the values of these least significant bits. Then the least significant bits for the other half of the red digital words are transferred to the DMD 16. This may be followed by the next-least significant bits of the red digital words, again in two stages, and so on until the most significant bits of the red digital words are displayed. After the red component of the frame has been displayed, the green and blue components can be displayed by feeding the various bit-ranks of the green and blue digital words to the DMD 16 in the same way.

The control unit 12 cooperates with a lighting unit 18. It a shown only schematically, and includes an illumination unit 20 and a motor-driven color wheel 22. The color wheel 22 includes red, green, and blue optical filters, and the illumination unit 20 includes one or more light sources which emits light that is then colored by these filters. The illumination unit 20 is preferably designed to emit light at different intensity levels in coordination with the bit ranks of the digital words that are supplied to the DMD 16. For example, the light intensity when the most significant bits of the digital words are displayed is preferably greater by a multiple of a power of two than the light intensity when the least significant bits are displayed. There may be one or more intermediate intensity levels. Details of how this may be done can be found in Applicant's U.S. Pat. Nos. 6,348,907 and 6,535,187, which are hereby incorporated herein by reference.

The colored light emitted by lighting unit 18 travels along an optical path marked by dotted line 24 and then impinges on an image-forming area 16' (illustrated schematically using a dot-dash chain line) of the DMD 16. This optical path extends through a spot-forming unit 26 and an optical system 28. The spot-forming unit 26 includes a light pattern device 30 and an actuator 32 that is linked to the device 30 and that shifts the light pattern device 30 back and forth between a left position and a right position.

Figure 2:
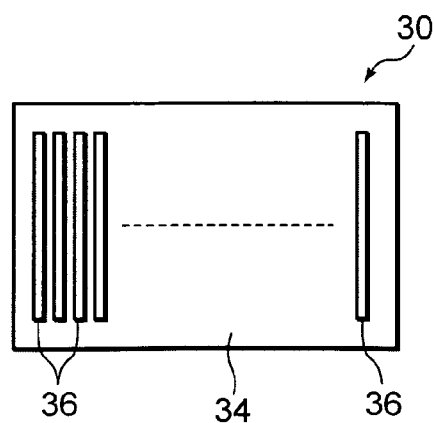
FIG. 2 is a top plan view of a light pattern device used in a spot-forming unit in FIG. 1.

FIG. 2 shows a top view of the light pattern device 30. In this embodiment, it is an opaque plate 34 having parallel slots 36 in it The optical system 28 focuses the slots on the image-forming area of the DMD 16. As a result, the micromirrors in the DMD 16 are illuminated by bands of light. The bands of light form spots of light on the individual micromirrors.

Figure 3A:
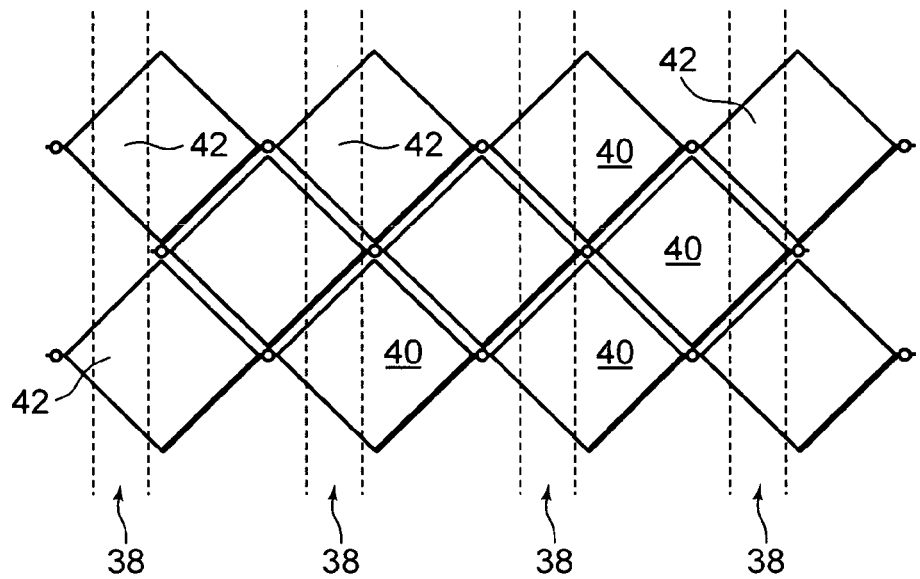
FIG. 3A is a top view of micromirrors in a small portion of the image forming area a DMD in FIG. 1, illuminated by a pattern of light bands that provide spots of light on the left side of the micromirrors.
Figure 3B:
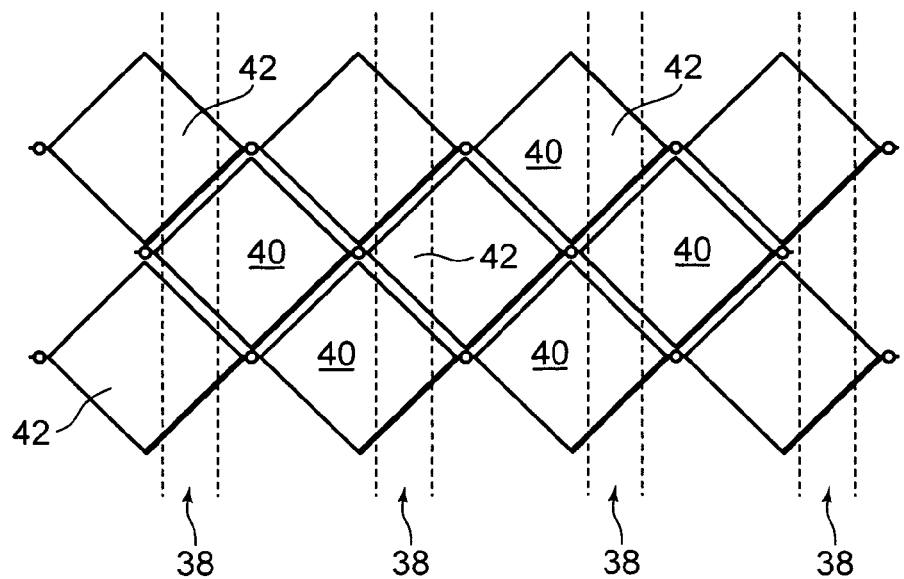
FIG. 3B is a top view of the micromirrors shown in FIG. 3A, with pattern of light bands shifted to provide spots of light on the right side of the micromirrors.

FIG. 3A shows bands 38 of light on micromirrors 40 when the light pattern device 30 is in its left position. As a result of the bands 38, each micromirror 40 receives a light spot 42 that covers some but not all of its surface. When the actuator 32 moves the light pattern device 32 to its right position, the bands 38 of light and thus also the light spots 42 are shifted. As will be seen in FIG. 3B, the light spots 42 now shine on the right portions of the micromirrors 40. This shifting of the light spots 42 permits each micromirror 40 to control two spots of light rather than one in the image formed by DMD 16.

Returning now to FIG. 1, the light reflected by the micromirrors 40 when they are in their on positions travels along an optical path marked by dotted line 44 to a mirror 46, which reflects the light to an optical system 50. The optical system 50 focuses the light on a screen 52.

The control unit 12 feeds half of the column data to the DMD 16 when the light pattern device 30 is in its left position and feeds the other half of the column data to the DMD 16 when the device 30 is in its right position. Accordingly, for each bit rank of the video words for each color component, the control unit 12 must write data into the DMD 16 twice. For example, the control unit 12 may feed half of the data for the least significant bit of the red digital words for a frame to the DMD 16 while the light pattern device 30 is in its left position, followed by the other half of the data for the least significant bit of the red digital words for the frame while the device 30 is in its right position, followed by half of the data for the next-least significant bit of the red digital words for the frame while the device 30 is in its left position, followed by the other half of the next-least significant bit of the red digital words for the frame while the device 30 is in it is right position, and so on. The bit ranks for the green and blue digital words would be split in the same way.

It was noted previously that the lighting unit 18 preferably emits light at different intensity levels. Increasing the intensity of the impinging light when the higher-order bit ranks are displayed reduces the time needed to display them, and correspondingly increases the time available for writing data twice to the DMD 16 for each bit rank of each color component. An example is shown in FIG. 6, where it is assumed that the video words for the red, green, and blue color components of an image have six bits. In this example, the light intensity I is set at a low level L during display of the three lower-order bit ranks and at a higher level H during display of the three higher-order bit ranks.

A drawback to the arrangement described above is that the light pattern device 30 intercepts half or more of the light that would otherwise reached the image-forming area 16' of DMD 16. Although not shown, this drawback could be reduced by enclosing the lighting unit 18 and the light pattern device 30 in a highly-reflective chamber and by making the back side of the device 30 itself highly reflective. The light intercepted by the device 30 would therefore be reflected back into the chamber, and a portion of this light returned to the chamber would be re-reflected to the device 30.

Figure 4:
FIG. 4 is a side view of an alternative light pattern device, with a series of rod lenses.
Figure 5:
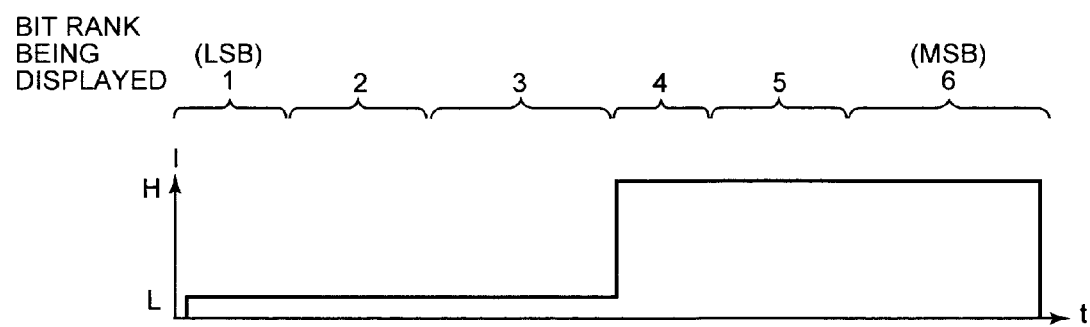
FIG. 5 is a graph showing an example of different light intensities that can be used during display of different bit ranks of six-bit video words for a given color component of an image.

FIG. 4 illustrates a side view of a modified light pattern device 52. It comprises a transparent substrate that supports parallel rod-shaped lenses, each of which collects light over a broader area than the slits 36 shown in FIG. 2. The rod-lenses of the device 52 focus the incoming light into the bands 38 shown in FIGS. 3A and 3B.

In the embodiment shown in FIG. 1, the light pattern device 30 is physically moved between left and right positions. A more elegant solution would be to use a polarizer and a large liquid crystal cell on one side of the light pattern device 32 to switch the polarization of the light bands 42 back and forth between two directions of polarization, and a double-refracting crystal on the other side of the device 30 to direct the light of each polarization to different positions on the DMD 16.

It will be apparent of those ordinarily skilled in the art that the arrangement shown in FIG. 1 could readily be modified to provide more than two light spots 42 on each micromirror 40. For example, a second spot-forming unit 26 could be added, with the slots 36 of the light pattern device 30 in the second unit 26 being perpendicular to the slots 36 in the other unit 30. It will also be apparent that an LCD instead of a DMD could be used as the spatial light modulator. Liquid crystal cells instead of micromirrors would then be the light-modulating elements of the spatial light modulator.

It will be understood that the above description of the present invention is susceptible to various modifications, changes, and adaptations, and the same are intended to be comprehended within the meaning and range of equivalents of the appended claims.

What is claimed is:

1. A method for displaying a color component of an image described by video words of a frame, the video words having bits with different bit ranks, said method comprising the steps of:
    (a) for a given one of the bit ranks, actuating light-modulating elements of a spatial light modulator in accordance with values of some of the video words for the given bit rank;
    (b) exposing the spatial light modulator to a light pattern that produces spots of light that are smaller than the light-modulating elements;
    (c) for the given bit rank, actuating the light-modulating elements of the spatial light modulator in accordance with values of others of the video words for the given bit rank; and
    (d) exposing the spatial light modulator to the light pattern, shifted with respect to the exposure in step (b).

2. The method of claim 1, wherein the spatial light modulator is a digital micromirror device and the light-modulating elements are micromirrors, and wherein steps (a) and (c) comprise turning the micromirrors on or off.

3. The method of claim 1, wherein the spatial light modulator is a digital micromirror device having an array of micromirrors that are disposed in an image-forming area of the digital micromirror device, and wherein steps (b) and (d) comprise exposing the digital micromirror device to light impinging on the image-forming area from a direction approximately perpendicular to the image-forming area.

4. The method of claim 3, wherein micromirrors that are on reflect light at an acute angle with respect to the image-forming area, and further comprising intercepting the light that is reflected at the acute angle with a reflector that re-directs the light.

5. The method of claim 3, wherein step (b) comprises passing light through a light pattern device when the light pattern device is in a first position, and step (d) comprises passing light through the light pattern device when the light pattern device is in a second position.

6. The method of claim 1, wherein steps (b) and (d) are conducted using light having a first intensity, and further comprising the steps of:
    (e) for another one of the bit ranks, actuating the light-modulating elements of a spatial light modulator in accordance with values of some of the video words for the another one of the bit ranks;
    (f) exposing the spatial light modulator to a light pattern that produces spots of light that are smaller than the light-modulating elements, using light having a second intensity;
    (g) for the another one of the bit ranks, actuating the light-modulating elements of the spatial light modulator in accordance with values of others of the video words for the another one of the bit ranks; and
    (h) exposing the spatial light modulator to the light pattern, shifted with respect to the exposure in step (f), using light having the second intensity.

7. A method for displaying a color component of an image described by video words of a frame, the video words having bits with different bit ranks, said method comprising the steps of:
    (a) generating light having the color of the color component;
    (b) conveying the light along an optical path to an image-forming area of a digital micromirror device, the light impinging on the image-forming area from a direction perpendicular to the image forming area.

8. The method of claim 7, wherein the optical path passes through a spot-forming unit, and further comprising actuating the spot-forming unit to produce light spots at different regions of the micromirrors of the digital micromirror device.

9. The method of claim 8, wherein the spot-forming device comprises a light pattern device having a pattern of apertures, and further comprising focusing the apertures on the image-forming area.

10. A method for displaying a color component of at least a portion of an image, said at least a portion of the image being described by a set of video words having bits with different bit ranks, said method comprising the steps of:
    (a) for a given one of the bit ranks, actuating micromirrors of a digital micromirror device in accordance with values of some of the video words for the given bit rank;
    (b) exposing the spatial light modulator to a light pattern that produces spots of light on the micromirrors, the spots of light being smaller than the micromirrors;
    (c) for the given bit rank, actuating the micromirros of the digital micromirror device in accordance with values of others of the video words for the given bit rank; and
    (d) exposing the digital micromirror device to the light pattern, shifted with respect to the exposure in step (b).

11. The method of claim 10, wherein the micromirrors that are disposed in an image-forming area of the digital micromirror device, and wherein steps (b) and (d) comprise exposing the digital micromirror device to light impinging on the image-forming area from a direction approximately perpendicular to the image-forming area.

12. The method of claim 11, wherein micromirrors that are on reflect light at an acute angle with respect to the image-forming area, and further comprising intercepting the light that is reflected at the acute angle with a reflector that re-directs the light.

13. The method of claim 10, wherein step (b) comprises passing light through a light pattern device when the light pattern device is in a first position, and step (d) comprises passing light through the light pattern device when the light pattern device is in a second position.

14. The method of claim 10, wherein steps (b) and (d) are conducted using light having a first intensity, and further comprising the steps of:

(e) for another one of the bit ranks, actuating the micromirrors of the digital micromirror device in accordance with values of some of the video words for the another one of the bit ranks;

(f) exposing the digital micromirror device to a light pattern that produces spots of light on the micromirrors that are smaller than the micromirrors, the light-modulating elements, using light having a second intensity;

(g) for the another one of the bit ranks, actuating the micromirrors of the digital micromirror device in accordance with values of others of the video words for the another one of the bit ranks; and (h) exposing the digital micromirror device to the light pattern, shifted with respect to the exposure in step (f), using light having the second intensity.

* * * * *